Patented July 20, 1943

2,324,489

UNITED STATES PATENT OFFICE 2,324,489

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application July 7, 1941, Serial No. 401,377

10 Claims. (Cl. 252—341)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The new chemical compound or composition of matter herein described, and intended to be used as the demulsifier of our process, is exemplified by the acidic, or preferably, neutral ester, derived by complete esterification of one mole of a polyalkylene glycol of the kind hereinafter described, with two moles of a fractional ester derived from a hydroxylated material of the kind herein described, and a polybasic carboxy acid having not over six carbon atoms.

If a hydroxylated material, indicated for the sake of convenience by the formult T'.OH, is reacted with a polybasic carboxy acid, which, similarly, may conveniently be of the dibasic type and indicated by the formula HOOC.D.COOH, then the fractional ester obtained by reaction between equimolar quantities may be indicated by the following formula:

HOOC.D.COO.T'

The polyethylene glycol may be characterized by materials of the kind such as heptaethylene glycol, octaethylene glycol, nonaethylene glycol, decaethylene glycol, and including heptadecaethylene glycol. For convenience these polyethylene glycols may be indicated by the following formula:

OH(C2H4O)mH in which m varies from 7 through 17.

Instead of polyethylene glycols, one may use polypropylene glycols or polybutylene glycols. Thus, for convenience, in the broadest aspect, the polyalkylene glycols employed may be indicated by the following formula:

OH(CnH2nO)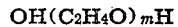mH in which m has its previous significance, and n represents a numeral varying from 2 to 4.

Thus, the bulk of the materials herein contemplated may be indicated within certain variations, as hereinafter stated, by the neutral ester  derived by esterification of one mole of a glycol of the kind above described, with two moles of a fractional ester of the kind previously described. The formation of the compound may be indicated by the following reaction, although obviously, it is immaterial what particular procedure is employed to produce the particular chemical compound or product:

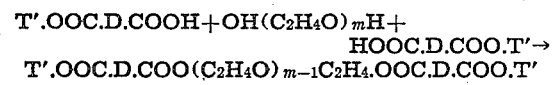

T'.OOC.D.COOH+OH(C2H4O)mH+
HOOC.D.COO.T'→
T'.OOC.D.COO(C2H4O)m−1C2H4.OOC.D.COO.T'

As indicated previously, the polybasic acids employed are limited to the type having not more than six carbon atoms, for example, oxalic, melonic, succinic, glutaric, and adipic. Similarly, one may employ acids such as fumaric, maleic, glutaconic, and various others, including citric, malic, tartaric, and the like. The selection of the particular tribasic or dibasic acid employed is usually concerned largely with convenience of manufacture of the finished ester, and also of the price of the reactants. Generally speaking, the higher the temperature employed, the easier it is to obtain large yields of the esterified product. Although oxalic acid is comparatively cheap, it decomposes somewhat readily at slightly above the boiling point of water. For this reason, it is more desirable to use an acid which is more resistant to pyrolysis. Similarly, when a polybasic acid is available in the form of an anhydride, such anhydride is apt to produce the ester with greater ease than the acid itself. For this reason, maleic anhydride is particularly adaptable; and also, everything else considered, the cost is comparatively low on a per molar basis, even though somewhat higher on a per pound basis. Succinic acid or the anhydride has many of the attractive qualities of maleic anhydride; and this is also true of adipic acid. For purposes of brevity, the bulk of the compounds, hereinafter illustrated will refer to the use of maleic anhydride, although it is understood that any other suitable polybasic acid may be employed. Furthermore, for purposes of convenience, reference is made to the use of polyethylene glycols. As has been previously indicated, such glycols can be replaced by suitable polypropylene or polybutylene compounds.

As far as the range of oxyalkylated compounds employed as reactants is concerned, it is our preference to employ those having approximately 8–12 oxyalkylene groups, particularly 8–12 oxyethylene groups. The preference to use the oxyethylated compounds is due, largely, to the fact that they are commercially available, and particularly so in two desirable forms. The most desirable form is the so-called nonaethylene glycol, which, although consisting largely of nonaethylene glycol, may contain small amounts of heptaethylene and octaethylene glycols, and possibly minor percentages of the higher homologs. Such glycols represent the upper range of distillable glycols; and they may be conveniently referred to as "upper distillable ethylene glycols." There is no particularly good procedure for making a sharper separation on a commercial scale; and it is understood that mixtures of one or more of the glycols may be employed, as well as a single glycol. As pointed out, it is particularly preferred to employ nonaethylene glycol as commercially available, although it is understood that this product contains other homologs, as indicated.

Substantially as desirable as the upper distillable polyethylene glycols, are the lower non-distillable polyethylene glycols. These materials are available in the form of a waxy water-soluble material, and the general range may vary somewhat from deca- to tetradeca-ethylene glycol. As is well understood, the method of producing such glycols would cause some higher homologs to be formed; and thus, even in this instance, there may be present some oxyethylene glycols within the higher range above indicated. One need not point out that these particular compounds consist of mixtures, and that in some instances, particularly desirable esters are obtained by making mixtures of the liquid nonaethylene glycol with the soft, waxy, lower non-distillable polyethylene glycols. For the sake of convenience, reference in the examples will be to nonaethylene glycol; and calculations will be based on a theoretical molecular weight of 414. Actually, in manufacture the molecular weight of the glycol employed, whether a higher distillable polyethylene glycol or a lower non-distillable polyethylene glycol, or a mixture of the same, shoud be determined and reaction conducted on the basis of such determination, particularly in conjunction with the hydroxyl or acetyl value.

It has been previously pointed out that it is immaterial how the compounds herein contemplated are manufactured, although we have found it most desirable to react the selected glycol, or mixtures of glycols, with maleic anhydride in a ratio of two moles of the anhydride for one mole of the glycol. Under such circumstances, we have found little tendency to form longer chain polymers; and in fact, the product of reaction, if conducted at reasonably low temperatures, appears to be largely monomeric. For convenience, such intermediate product may then be considered as a dibasic or polybasic acid. One mole of the intermediate so obtained is then reacted with two moles of the alcoholic material of the kind subsequently described.

It is to be noted, however, that if one prepares a fractional acidic ester, then if two moles of the fractional acidic ester are reacted with one mole of the polyethylene glycol, there is no possibility for the formation of polymeric types of esterification products under ordinary conditions.

The alcoholic bodies employed as reactants in one mode of manufacture of the present compounds are hydroxylated acylated monoamino bodies free from ether linkages, and of the following formula type:

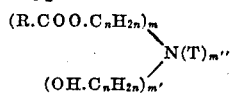

in which R.COO represents the oxy-acyl radical derived from a monobasic detergent-forming acid; T represents a hydrogen atom or a non-hydroxy hydrocarbon radical, or the acylated radical obtained by replacing a hydrogen atom of the hydroxyl group of an alkylol radical by the acyl radical of a monobasic carboxy acid having less than eight carbon atoms; $n$ represents a small whole number which is less than 10; $m$ represents the numeral 1, 2, or 3; $m'$ represents the numeral 0, 1, or 2; and $m''$ represents the numeral 0, 1, or 2, with the proviso that $m+m'+m''=3$.

One can obtain or manufacture chemical compounds whose composition is indicated by the following formulas:

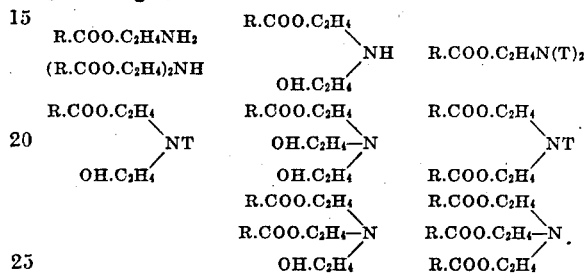

If, in the above formulas, T represents an amino hydrogen atom, as well as a substituent therefor, then the formulas above described may be summarized by the following formula:

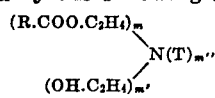

However, the radical $C_2H_4$, which appears in the above formula, may represent any similar radical, such as a $C_3H_6$ radical, a $C_4H_8$ radical, etc., and therefore, the above formula may be indicated as follows:

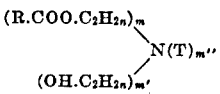

in which R.COO represents the oxy-acyl radical derived from a monobasic detergent-forming acid; T represents a hydrogen atom or a non-hydroxy hydrocarbon radical, or the acylated radical obtained by replacing a hydrogen atom of the hydroxyl group of an alkylol radical by the acyl radical of a monobasic carboxy acid having less than 8 carbon atoms; $n$ represents a small whole number, which is less than 10; $m$ represents the numeral 1, 2, or 3; $m'$ represents the numeral 0, 1, or 2; and $m''$ represents the numeral 0, 1, or 2, with the proviso that $$m+m'+m''=3$$

In the above formulas it has been pointed out that T represents a hydrogen atom, or a non-hydroxy aliphatic hydrocarbon radical, such as a methyl radical, ethyl radical, propyl radical, amyl radical, octadecyl radical, etc. However, T may also represent a non-hydroxy alicyclic radical, such as a cyclohexyl radical or a non-hydroxy aralkyl radical, such as a benzyl radical; or T may represent the acylated radical obtained by replacing a hydrogen atom of the hydroxyl group of an alkylol radical, or the equivalent thereof, by the acyl radical of a monobasic carboxy acid, such as acetic acid, butyric acid, heptoic acid, or the like; all of which are characterized by having less than eight carbon atoms. The alkylol radical prior to acylation, may be a hydroxy alicyclic or a hydroxy aralkyl radical, provided the hydroxy radical is attached to the aliphatic residue of the aralkyl radical.

In the above formula, as has been pointed out, R.COO represents the oxy-acyl or acid radical derived from the acid R.COOH. R.COOH represents any monobasic detergent-forming carboxy acid, such as a typical fatty acid or abietic acid or naphthenic acid.

Typical fatty acids are those which occur in naturally-occurring oils and fats, and generally have eight or more carbon atoms and not over 32 carbon atoms. Common examples include oleic acid, stearic acid, linoleic acid, linolenic acid, ricinoleic acid, erucic acid, palmitic acid, myristic acid, etc. These acids combine with alkali to produce soap or soap-like materials, and are commonly referred to as being monobasic detergent-forming carboxy acids.

The alkylol radical, previously referred to, prior to esterification, may be a hydroxy alicyclic or a hydroxy aralkyl radical, provided the hydroxy radical is attached to the aliphatic residue of the aralkyl radical.

As to the amines above described, which happen to be tertiary amines, it may be well to point out that these may be formed readily by a reaction involving an ester of the selected detergent-forming acid, for instance, a fatty acid ester, such as the glyceride, and a corresponding amine. This may be illustrated in the following manner:

tertiary amines illustrated. Reference is made to Patent No. 2,167,349, dated July 25, 1939, to De Groote, Keiser and Blair.

In the remaining type of material there is an amino hydrogen atom present. The manufacture of such material may be illustrated by the following reactions:

R.COOH+OHC2H4OH→R.COO.C2H4OH
R.COO.C2H4OH+HCl→R.COO.C2H4Cl

R.CO.Cl+OHC2H4OH→R.COO.C2H4OH
R.COO.C2H4OH+HCl→R.COO.C2H4Cl

R.COOH+OHC2H4Cl→R.COO.C2H4Cl
R.COOR'+OHC2H4Cl→R.COO.C2H4Cl
R.CO.Cl+OHC2H4Cl→R.COO.C2H4Cl

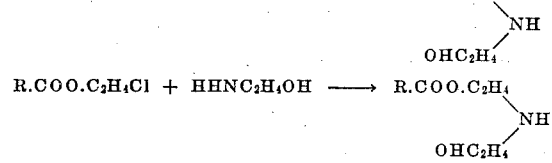

However, if maximum yields are not necessary,

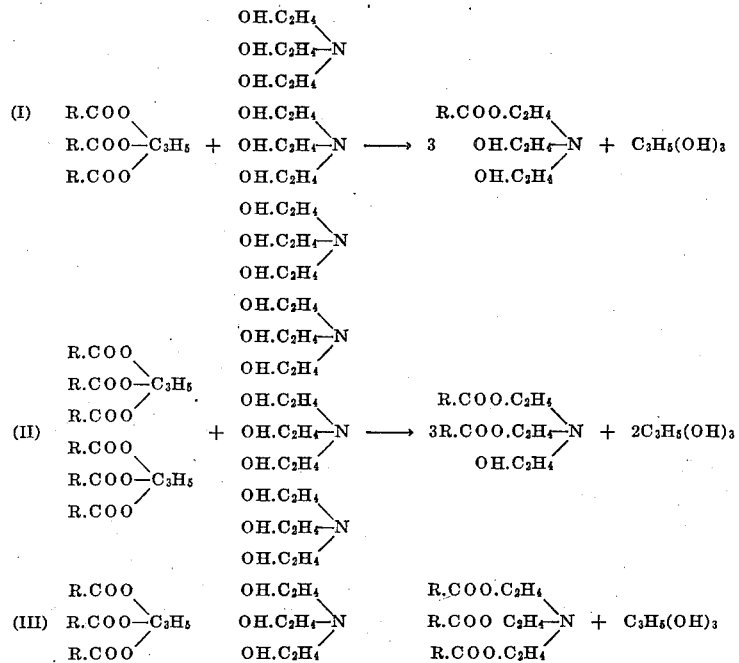

If triethanolamine, employed in the above formula, is replaced by ethyl diethanolamine, then one would obtain one of the remaining types of one need not resort to reactions of the kind previously described to produce secondary amines, but one may employ the following type of reaction:

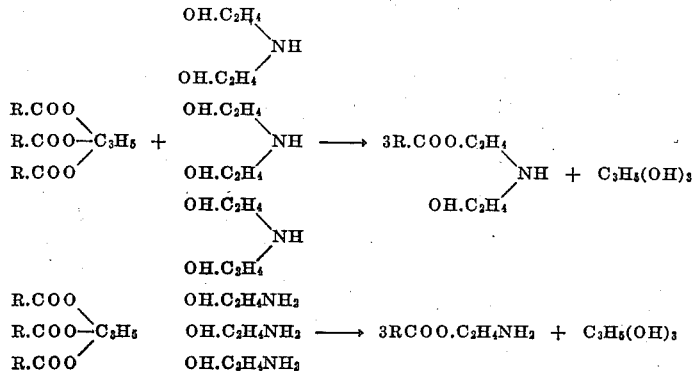

Suitable primary and secondary amines, which may be employed to produce materials of the kind above described, include the following: diethanolamine, monoethanolamine, ethyl ethanolamine, methyl ethanolamine, propanolamine, dipropanolamine, propyl propanolamine, etc. Other examples include cyclohexylolamine, dicyclohexylolamine, cyclohexyl ethanolamine, cyclohexyl propanolamine, benzylethanolamine, benzylpropanolamine, pentanolamine, hexanolamine, octylethanolamine, octadecylethanolamine, cyclohexanolethanolamine, etc.

Similarly, suitable tertiary amines which may be employed include the following: triethanolamine, diethanolalkylamines, such as diethanol ethylamine, diethanol propylamine, etc. Other examples include diethanol methylamine, tripropanolamine, dipropanol methylamine, cyclohexanol diethanolamine, dicyclohexanol ethanolamine, cyclohexyl diethanolamine, dicyclohexyl ethanolamine, dicyclohexanol ethylamine, benzyl diethanolbenzyl dipropanolamine, tripentanolamine, trihexanolamine, hexyl ethanolamine, octadecyl diethanolamine, etc.

Reference is again made to the formula which summarizes the various hydroxylated amines used as intermediate raw materials, viz.:—

in which the characteristics have their previous significance. Attention is directed to the fact that where the substituted alkyl radical

OH.R.COO.CH— appears, a suitable non-aryl radical other than an aliphatic residue may serve as the functional equivalent; for instance, an alicyclic radical derived from a cyclohexyl radical, or an aralkyl radical derived from a benzyl radical. In other words, in the hereto appended claims references to the $C_nH_{2n}$ radical, as such, or as an alkyl radical or residue, is intended in the broad sense to include the alicyclic radical or residues, or the aralkyl radicals or residues which are the equivalent thereof. There is no intention to include an aromatic radical where there is a direct linkage between the aromatic nucleus and the amino nitrogen atom, for the reason that such products have little or no basicity and do not have the characteristic properties of the amines previously described.

In indicating the various hydroxylated tertiary amines of the non-aryl type, which may be employed to produce the amine contemplated as the demulsifying agent of the present process, it is desirable to indicate that amines of the type where a hydroxy acyl radical replaces a hydrogen atom of the hydroxyl radical of the hydroxy tertiary amine, are not included within the broad class of hydroxy tertiary amines, unless there is another hydroxyl radical attached to the usual alkyl radical. For instance, if ethyl diethanolamine is treated with two moles of lactic acid so as to form the dilactyl compound of the following formula:

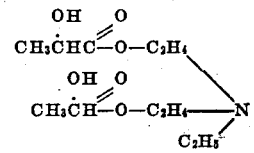

then it is understood that such materials would not represent a hydroxy tertiary amine within the meaning or scope, as herein employed. If, on the other hand, triethanolamine were treated with lactic acid, so as to give monolactyl triethanolamine of the following composition:

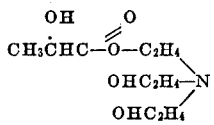

then such compound would be included, due to the presence of one or more hydroxyl radicals attached to the alkyl radicals.

Similarly, in indicating the various hydroxylated primary or secondary amines of the non-aryl type, which may be employed to produce the amine contemplated as the demulsifying agent of the present process, it is desirable to indicate that amines of the type where a hydroxy acyl radical replaces a hydrogen atom of the hydroxyl radical of a hydroxy primary or secondary amine, are not included within the broad class of hydroxy tertiary amines, unless there is another hydroxyl radical attached to the usual alkyl radical. For instance, if ethanolamine is treated with lactic acid so as to form the lactyl derivative of the following formula:

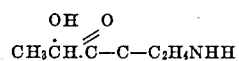

then it is understood that such materials would not represent a hydroxy primary amine within the meaning or scope, as herein employed. The same would be true if the corresponding product were derived from diethanolamine, provided both hydroxy radicals had been esterified, with lactic acid.

The manufacture of compounds from tertiary amines is relatively simple, because no precautions are necessary to prevent amidification. The selected detergent-forming acid, or ester, as, for example, a fatty oil and the selected hydroxy tertiary amine, are mixed in suitable proportions and heated at some point above the boiling point of water, for instance, 110° C., and at a point below the decomposition point of the amine or the fatty oil, for instance, 180° C., for a suitable period of time, such as two to eight hours. Mild agitation is employed. A catalyst, such as sodium oleate, sodium carbonate, caustic soda, etc., may be present in amounts of about one-half of 1%, or less. It is noted that the fatty acids are employed in this instance, in the form of an ester, to wit, the glyceride, although, as previously pointed out, other functional equivalents can be readily employed with equal facility. It is to be noted that the reactions above described do not take place to any appreciable extent if the fatty acid has been converted into the soap or salt. Such salts are not functional equivalents. As previously indicated, an ester of abietic acid or naphthenic acid might be employed, if desired.

When, however, one is employing a hydroxy-secondary amine, precautions must be taken, so that one gets a substantial percentage of products derived by esterification, rather than amidification. Any suitable ester may be employed, but it is often most convenient to employ the glyceride of a fatty acid, for instance, triricinolein. The selected glyceride and the selected hydroxy secondary amine are mixed in suitable proportions and heated at some point above the boiling point of water, for instance, 110° C., and below the decomposition point of the amine or fatty material, for instance, 180° C., for a suitable period of time, such as 4-24 hours. Mild agitation is employed. A catalyst, such as sodium oleate, sodium carbonate, caustic soda, etc., may be present in amounts of about ½%, or less. It is to be noted that the fatty acids are present in ester form and not in the form of the free acid, and thus there is no tendency to form the salt to any marked extent; and if conducted at the lower range of reaction temperatures, there is a decided tendency to form the esterification products, rather than the amidification products.

Amide-type compounds can be converted into the ester type in the manner described in U. S. Patent No. 2,151,788, dated March 28, 1939, to Mauersberger. Similarly, amides in which there is an amino hydrogen atom attached to the amino nitrogen atom can be treated with an oxyalkylating agent such as ethylene oxide, propylene oxide, glycidol, or the like, so as to introduce a hydroxy hydrocarbon radical. In the event that no hydroxy hydrocarbon radical is available for reaction with a material such as nonaethylene glycol dihydrogen dimaleate, then in that event the acyl radical present must contain a hydroxyl radical. In other words, one must employ ricinoleic acid, hydroxystearic acid, or some similar equivalent.

In order to illustrate suitable examples of the hydroxylated amines which may be used as intermediate raw materials for reaction with the polyalkylene glycol dihydrogen diacid ester, attention is directed to the following examples:

INTERMEDIATE HYDROXYLATED AMINE

*Example 1*

Castor oil is employed. For the sake of convenience, its molecular weight is considered as being 925. Commercial triethanolamine and castor oil in the proportion of one mole of castor oil and three moles of triethanolamine are heated to a temperature between 150-180° C. for two hours. Mild agitation is employed.

INTERMEDIATE HYDROXYLATED AMINE

*Example 2*

The same procedure is followed as in Intermediate hydroxylated amine, Example 1, except that the ratio employed is two moles of the castor oil to three moles of triethanolamine.

INTERMEDIATE HYDROXYLATED AMINE

*Example 3*

The same procedure is employed as in Intermediate hydroxylated amine, Example 1, except that the ratio employed is three moles of castor oil to three moles of triethanolamine.

INTERMEDIATE HYDROXYLATED AMINE

*Example 4*

One mole of methyl naphthenate is reacted in the manner previously described with one molecule of triethanolamine.

INTERMEDIATE HYDROXYLATED AMINE

*Example 5*

Diethanolamine is substituted for triethanolamine in Example 4.

INTERMEDIATE HYDROXYLATED AMINE

*Example 6*

Methyl abietate is substituted for methyl naphthenate in Examples 4 and 5, above.

INTERMEDIATE HYDROXYLATED AMINE

*Example 7*

Olive oil is substituted for castor oil in Examples 1 and 2, preceding, care being taken that the completed product contains at least one hydroxyethyl group.

INTERMEDIATE HYDROXYLATED AMINE

*Example 8*

Ethyl diethanolamine is substituted for triethanolamine in Example 1, preceding.

INTERMEDIATE HYDROXYLATED AMINE

*Example 9*

Cyclohexyl diethanolamine is substituted for ethyl diethanolamine in the example immediately preceding.

INTERMEDIATE HYDROXYLATED AMINE

*Example 10*

Benzyl diethanolamine is substituted for ethyl diethanolamine in Example 8, above.

INTERMEDIATE HYDROXYLATED AMINE

*Example 11*

Castor oil (triricinolein) is employed. For convenience its molecular weight is considered as being 925. Commercial diethanolamine and castor oil in the proportion of one mole of castor oil to three moles of diethanolamine, are heated to a temperature of 120-140° C., for about 12 hours. Mild agitation is employed. Loss of basicity is an indication of amidification. Time of esterification may be extended or temperature lowered or raised, so as to insure maximum esterification, and particularly, so as to produce a product characterized by the presence of one unesterified alkylol radical attached to the amino nitrogen.

INTERMEDIATE HYDROXYLATED AMINE

*Example 12*

In the previous examples where castor oil is employed, blown castor oil is substituted therefor. We prefer to use a drastically oxidized castor oil having approximately the following characteristics:

| | |
|---|---|
| Acid number | 13.2 to 25.0 |
| Saponification number | 230.5 to 274.0 |
| Iodine number | 43.5 to 55.0 |
| Acetyl number | 164.0 to 192.0 |
| Hydroxyl value | 188.0 to 220.0 |
| Percent unsaponifiable matter | 1.1 |
| Percent nitrogen | 0.0 |
| Percent SO₃ | 0.0 |
| Percent ash | Trace |

(See also U. S. Patent No. 2,225,824, dated December 24, 1940, to De Groote and Wirtel).

Having obtained hydroxylated acetylated monoamino bodies or compounds free from ether linkages and of the kind previously described, the next step, of course, is to obtain fractional esters derived from nonaethylene glycol of the kind previously described in the earlier part of the present disclosure. Such materials may be illustrated by the following examples:

GLYCOL ESTER INTERMEDIATE PRODUCT

*Example 1*

One pound mole of nonaethylene glycol is reacted with two pound moles of maleic anhydride, so as to form nonaethylene glycol dihydrogen dimaleate.

GLYCOL ESTER INTERMEDIATE PRODUCT

Example 2

A mixure of lower non-distillable polyethylene glycols, representing approximately deca- to tetradecaethylene glycol, is substituted for nonaethylene glycol in the preceding example.

GLYCOL ESTER INTERMEDIATE PRODUCT

Example 3

A 50-50 mixture of nonaethylene glycol and lower nondistillable polyethylene glycols of the kind described in the previous example is substituted for nonaethylene glycol in Example 1.

GLYCOL ESTER INTERMEDIATE PRODUCT

Example 4

Adipic acid is substituted for maleic anhydride in Examples 1-3, preceding.

GLYCOL ESTER INTERMEDIATE PRODUCT

Example 5

Oxalic acid is substituted for maleic anhydride in Examples 1-3, preceding.

GLYCOL ESTER INTERMEDIATE PRODUCT

Example 6

Citric acid is substituted for maleic anhydride in Examples 1-3, preceding.

GLYCOL ESTER INTERMEDIATE PRODUCT

Example 7

Succinic anhydride is substituted for maleic anhydride in Examples 1-3, preceding.

The method of producing such fractional esters is well known. The general procedure is to employ a temperature above the boiling point of water and below the pyrolytic point of the reactants. The products are mixed and stirred constantly during the heating and esterification step. If desired, an inert gas, such as dried nitrogen, or dried carbon dioxide, may be passed through the mixture. Sometimes it is desirable to add an esterification catalyst, such as sulfuric acid, benzene sulfonic acid, or the like. This is the same general procedure as employed in the manufacture of ethylene glycol dihydrogen diphthalate. See U. S. Patent No. 2,075,107, dated March 30, 1937, to Frasier.

Sometimes esterification is conducted most readily in the presence of an inert solvent, that carries away the water of esterification which may be formed, although, as is readily appreciated, such water of esterification is absent when the reaction involves an acid anhydride, such as maleic anhydride, and a glycol. However, if water is formed, for instance, when citric acid is employed, then a solvent such as xylene may be present and employed to carry off the water formed. The mixture of xylene vapors and water vapors can be condensed so that the water is separated. The xylene is then returned to the reaction vessel for further circulation. This is a conventional and well-known procedure and requires no further elaboration.

COMPOSITION OF MATTER.—Example 1

Two pound moles of a tertiaryamine of the following composition:

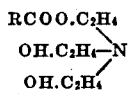

in which R.CO represents the ricinoleyl radical, are reacted with one pound mole of a glycol ester intermediate product of the kind described under Glycol ester intermediate products, Examples 1, 2 and 3, preceding. Such reaction is continued until substantially all carboxyl acidity has disappeared. The time of reaction may vary from a few hours to as many as 20 hours.

COMPOSITION OF MATTER.—Example 2

A comparable compound of the kind previously described is obtained from tripropanolamine instead of triethanolamine.

COMPOSITION OF MATTER.—Example 3

Materials of the kind described in Composition of Matter, Examples 1 and 2, are obtained from soyabean fatty acids instead of castor oil fatty acids.

COMPOSITION OF MATTER.—Example 4

Glycol ester intermediate products of the kind exemplified by Examples 4-7, preceding, are substituted for Glycol intermediate products, Examples 1, 2 and 3 in the preceding three examples.

It is to be noted that this second step is an esterification reaction, and the same procedure is employed, as suggested above, in the preparation of the intermediate product. Needless to say, any particular method may be used to produce the desired compounds of the kind indicated. In some instances it may be desirable to conduct the esterification reaction in the presence of a non-volatile inert solvent which simply acts as a diluent or viscosity reducer.

In the preceding examples, attention has been directed primarily to the monomeric form, or at least, to the form in which the bifunctional alcohol, i. e., a glycol, and the polyfunctional acid, usually a bifunctional compound, react to give a chain type compound, in which the adjacent acid and glycol nucleus occur as a structural unit. For instance, in the monomeric form this may be indicated in the following manner:

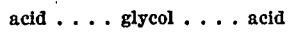

If, however, one prepared an intermediate product employing the ratio of three moles of maleic anhydride and two moles of nonaethylene glycol, the tendency would be to produce a product which might be indicated in the following manner:

Similarly, three moles of the glycol and four moles of the acid might tend to give a combination which may be indicated thus:

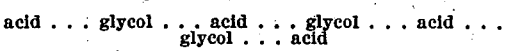

Another way of stating the matter is that the composition may be indicated in the following manner:

TOOC.D.COO[(C₂H₄O)$_{m-1}$C₂H₄OOC.D.COO]$_x$T in which the characters have their previous significance and $x$ is a relatively small whole number less than 10 and probably less than 5; and in the monomeric form $x$, of course, is 1. The limitations on the size of $x$ are probably influenced largely by the fact that reaction leading to further growth is dependent upon random contact.

Some of the products are self-emulsifiable oils or self-emulsifiable compounds; whereas, others give cloudy solutions or sols; and the most desirable type is characterized by giving a clear solution in water, and usually in the presence of soluble calcium or magnesium salts, and frequently, in the presence of significant amounts of either acids or alkalies.

Water solubility can be enhanced in a number of ways which have been suggested by previous manufacturing directions, for instance:

(a) By using a more highly polymerized ethylene glycol;

(b) By using a polymeric form instead of a monomeric form in regard to the unit which forms the chain between the two alcoholic nuclei;

(c) By using a polybasic carboxy acid of lower molecular weight, for instance, maleic acid, instead of adipic acid;

(d) By using an amine of a lower molecular weight or having more hydroxyl groups, as, for example, a derivative of glycerylamine.

Indeed, in many instances the hydroxylated acylated amino compound is water-soluble prior to reaction with a glycol ester. It is to be noted that in this instance, one is not limited to hydroxylated materials which are water-soluble prior to reaction with a glycol ester; but they may, in fact, be perfectly water-soluble.

Actually, a reaction involving an alcohol and an acid (esterification) may permit small amounts of either one or both of the reactants, depending upon the predetermined proportion, to remain in an unreacted state. In the actual preparation of compositions of the kind herein contemplated, any residual acidity can be removed by any suitable base, for instance, ammonia, triethanolamine, or the like, especially in dilute solution. Naturally, precaution should be taken, so that neutralization takes place without saponification or decomposition of the ester. In some cases there is no objection to the presence of the acidic group. Indeed, if a tribasic acid be employed in such a manner as to leave one free carboxyl group, then it is usually desirable to neutralize such group by means of a suitable basic material.

In the hereto appended claims, reference to a neutral product refers to one in which free carboxylic radicals are absent.

Conventional demulsifying agents employed in the treatment of oil field emulsions are used as such, or after dilution with any suitable solvent, such as water; petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described, may be admixed with one or more of the solvents customarily used in connection with conventional demulsifying agents, provided that such compounds are compatible. They will be compatible with the hydrophile type of solvent in all instances. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described, except that they are invariably water-soluble.

We desire to point out that the superiority of the reagent or demulsifying agent contemplated in our herein described process for breaking petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our improved process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

It will be apparent to those skilled in the art that residual carboxyl acidity can be eliminated by esterification with a low molal alcohol, for instance, ethyl, methyl, or propyl alcohol, by conventional procedure, so as to give a substantially neutral product. The introduction of such low molal hydrophobe groups does not seriously affect the solubility, and in some instances, gives increased resistance, to soluble calcium and magnesium salts, for such property is of particular value. Usually, however, neutralization with a dilute solution of ammonia or the like is just as practicable and less expensive.

In the hereto appended claims, it is intended that the monomeric forms contemplate also the polymeric forms, insofar that the polymeric forms are nothing more or less than a repetition of the monomeric forms several times over, with the loss of one or more moles of water.

Having thus described our invention, what we claim as new and desire to secure by Letters Patent is:

1. A process for breaking petroleum emulsions of the water-in-oil type, characterized by subjecting the emulsion to the action of a demulsifying agent comprising a water-soluble esterification product derived by reaction between one mole of a polybasic compound, and 2 moles of a hydroxylated acylated monoamino compound free from ether linkages; the polybasic compound being the esterification product of (A) a polyalkylene glycol having at least 7 and not more than 17 ether linkages, and the alkylene radical thereof containing at least 2 and not more than 6 carbon atoms; and (B) a polybasic carboxy acid having not more than 6 carbon atoms; and the ratio of the esterifying reactants being within the range of more than 1 and not over 2 moles of the polybasic acid for each mole of the glycol; and said hydroxylated acylated amino compound free from ether linkages being of the following type:

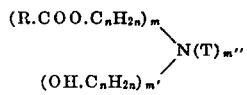

in which R.COO represents the oxy-acyl radical derived from a monobasic detergent-forming acid; T represents a member of the class consisting of hydrogen atoms, non-hydroxyl hydrocarbon radicals, and acylated radicals, obtained by replacing a hydrogen atom of the hydroxyl group of an alkylol radical by the acyl radical of a monobasic carboxy acid having less than 8 carbon atoms; $n$ represents a small whole number which is less than 10; $m$ represents the numeral 1, 2, or 3; $m'$ represents the numeral 0, 1, or 2; and $m''$ represents the numeral 0, 1, or 2, with the proviso that $m+m'+m''=3$.

2. A process for breaking petroleum emulsions of the water-in-oil type, characterized by subjecting the emulsion to the action of a demulsifying agent comprising a neutral, water-soluble esterification product derived by reaction between one mole of a polybasic compound, and 2 moles of a hydroxylated acylated monoamino compound free from ether linkages; the polybasic compound being the esterification product of (A) a polyalkylene glycol having at least 7 and not more than 17 ether linkages, and the alkylene radical thereof containing at least 2 and not more than 6 carbon atoms; and (B) a polybasic carboxy acid having not more than 6 carbon atoms; and the ratio of the esterifying reactants being within the range of more than 1 and not over 2 moles of the polybasic acid for each mole of the glycol; and said hydroxylated acylated amino compound free from either linkages being of the following type:

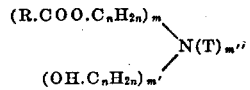

in which R.COO represents the oxy-acyl radical derived from a monobasic detergent-forming acid; T represents a member of the class consisting of hydrogen atoms, non-hydroxyl hydrocarbon radicals, and acylated radicals, obtained by replacing a hydrogen atom of the hydroxyl group of an alkylol radical by the acyl radical of a monobasic carboxy acid having less than 8 carbon atoms; $n$ represents a small whole number which is less than 10; $m$ represents the numeral 1, 2, or 3; $m'$ represents the numeral 0, 1, or 2; and $m''$ represents the numeral 0, 1, or 2, with the proviso that $m+m'+m''=3$.

3. A process for breaking petroleum emulsions of the water-in-oil type, characterized by subjecting the emulsion to the action of a demulsifying agent comprising a neutral, water soluble esterification product derived by reaction between one mole of a dibasic compound and 2 moles of a hydroxylated acylated monoamino compound free from ether linkages; the dibasic compound being the esterification product of (A) a polyalkylene glycol having at least 7 and not more than 17 ether linkages, and the alkylene radical thereof containing at least 2 and not more than 6 carbon atoms; and (B) a dibasic carboxy acid having not more than 6 carbon atoms; and the ratio of the esterifying reactants being within the range of more than 1 and not over 2 moles of the dibasic acid for each mole of the glycol; and said hydroxylated acylated amino-ether free from ether linkages being of the following type:

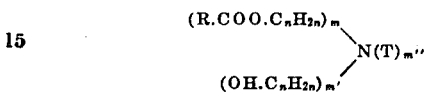

in which R.COO represents the oxy-acyl radical derived from a monobasic detergent-forming acid; T represents a member of the class consisting of hydrogen atoms, non-hydroxy hydrocarbon radicals, and acylated radicals, obtained by replacing a hydrogen atom of the hydroxyl group of an alkylol radical by the acyl radical of a monobasic carboxy acid having less than 8 carbon atoms; $n$ represents a small whole number which is less than 10; $m$ represents the numeral 1, 2, or 3; $m'$ represents the numeral 0, 1, or 2; and $m''$ represents the numeral 0, 1, or 2, with the proviso that $m+m'+m''=3$.

4. A process for breaking petroleum emulsions of the water-in-oil type, characterized by subjecting the emulsion to the action of a demulsifying agent comprising a neutral, water-soluble esterification product derived by reaction between one mole of a dibasic compound and 2 moles of a hydroxylated acylated monoamino compound free from ether linkages; the dibasic compound being the esterification product of (A) a polyalkylene glycol having at least 7 and not more than 17 ether linkages; and the alkylene radical thereof containing at least 2 and not more than 4 carbon atoms; and (B) a dibasic carboxy acid having not more than 6 carbon atoms; and the ratio of the esterifying reactants being within the range of more than 1 and not over 2 moles of the dibasic acid for each mole of the glycol; and said hydroxylated acylated amino-ether free from ether linkages being of the following type:

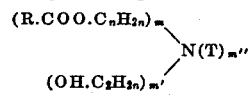

in which R.COO represents the oxy-acyl radical derived from a monobasic detergent-forming acid; T represents a member of the class consisting of hydrogen atoms, non-hydroxy hydrocarbon radicals, and acylated radicals, obtained by replacing a hydrogen atom of the hydroxyl group of an alkylol radical by the acyl radical of a monobasic carboxy acid having less than 8 carbon atoms; $n$ represents a small whole number which is less than 10; $m$ represents the numeral 1, 2, or 3; $m'$ represents the numeral 0, 1, or 2; and $m''$ represents the numeral 0, 1, or 2, with the proviso that $m+m'+m''=3$.

5. A process for breaking petroleum emulsions of the water-in-oil type, characterized by subjecting the emulsion to the action of a demulsifying agent comprising a neutral, water-soluble esterification product derived by reaction between one mole of a dibasic compound and 2 moles of a hydroxylated acylated monoamino compound free from ether linkages; the dibasic compound being the esterification product of (A)

a polyethylene glycol having at least 7 and not more than 17 ether linkages; and (B) a dibasic carboxy acid having not more than 6 carbon atoms; and the ratio of the esterifying reactants being within the range of more than 1 and not over 2 moles of the dibasic acid for each mole of the glycol; and said hydroxylated acylated amino-ether free from ether linkages being of the following type:

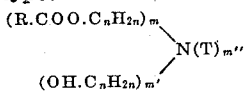

in which R.COO represents the oxy-acyl radical derived from a monobasic detergent-forming acid; T represents a member of the class consisting of hydrogen atoms, non-hydroxy hydrocarbon radicals, and acylated radicals, obtained by replacing a hydrogen atom of the hydroxyl group of an alkylol radical by the acyl radical of a monobasic carboxy acid having less than 8 carbon atoms; $n$ represents a small whole number which is less than 10; $m$ represents the numeral 1, 2, or 3; $m'$ represents the numeral 0, 1, or 2; and $m''$ represents the numeral 0, 1, or 2, with the proviso that $m+m'+m''=3$.

6. A process for breaking petroleum emulsions of the water-in-oil type, characterized by subjecting the emulsion to the action of a demulsifying agent comprising a neutral water-soluble chemical compound of the following type:

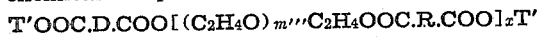

in which T' is a radical derived by the dehydroxylation of a hydroxylated acylated amino compound free from ether linkage and of the following formula type:

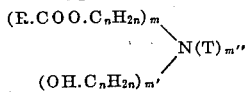

in which R.COO represents the oxy-acyl radical derived from a monobasic detergent-forming acid; T represents a member of the class consisting of hydrogen atoms, non-hydroxy hydrocarbon radicals, and acylated radicals, obtained by replacing a hydrogen atom of the hydroxyl group of an alkylol radical by the acyl radical of a monobasic carboxy acid having less than 8 carbon atoms; $n$ represents a small whole number which is less than 10; $m$ represents the numeral 1, 2, or 3; $m'$ represents the numeral 0, 1, or 2; and $m''$ represents the numeral 0, 1, or 2, with the proviso that $m+m'+m''=3$; OOC.D.COO is the acid radical derived from a dibasic acid by removal of the acidic hydrogen atoms; said acid radical having not over 6 carbon atoms; $m'''$ represents a numeral varying from 7 to 12; and $x$ is a small whole number less than 10.

7. A process for breaking petroleum emulsions of the water-in-oil type, characterized by subjecting the emulsion to the action of a demulsifying agent comprising a neutral, water-soluble chemical compound of the following formula type:

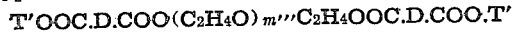

in which T' is a radical derived by the dehydroxylation of a hydroxylated acylated amino compound free from ether linkages and of the following formula type:

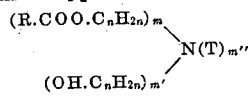

in which R.COO represents the oxy-acyl radical derived from a monobasic detergent-forming acid; T represents a member of the class consisting of hydrogen atoms, non-hydroxy hydrocarbon radicals, and acylated radicals, obtained by replacing a hydrogen atom of the hydroxyl group of an alkylol radical by the acyl radical of a monobasic carboxy acid having less than 8 carbon atoms; $n$ represents a small whole number which is less than 10; $m$ represents the numeral 1, 2, or 3; $m'$ represents the numeral 0, 1, or 2; and $m''$ represents the numeral 0, 1, or 2, with the proviso that $m+m'+m''=3$; OOC.D.COO is the acid radical derived from a dibasic acid by removal of the acidic hydrogen atoms; said acid radical having not over 6 carbon atoms; and $m'''$ represents a numeral varying from 7 to 12.

8. A process for breaking petroleum emulsions of the water-in-oil type, characterized by subjecting the emulsion to the action of a demulsifying agent comprising a neutral, water-soluble chemical compound of the following formula type:

T'OOC.D.COO(C₂H₄O)$_{m'''}$C₂H₄OOC.D.COO.T' in which T' is a radical derived by the dehydroxylation of a hydroxylated acylated amino compound free from ether linkages and of the following formula type:

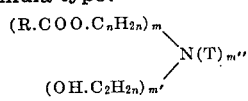

in which R.COO represents the oxy-acyl radical derived from a monobasic detergent-forming acid; T represents a member of the class consisting of hydrogen atoms, non-hydroxy hydrocarbon radicals, and acylated radicals, obtained by replacing a hydrogen atom of the hydroxyl group of an alkylol radical by the acyl radical of a monobasic carboxy acid having less than 8 carbon atoms; $n$ represents a small whole number which is less than 10; $m$ represents the numeral 1, 2, or 3; $m'$ represents the numeral 0, 1, or 2; and $m''$ represents the numeral 0, 1, or 2, with the proviso that $m+m'+m''=3$; OOC.D.COO is the acid radical derived from maleic acid by removal of the acidic hydrogen atoms; and $m'''$ represents a numeral varying from 7 to 12.

9. A process for breaking petroleum emulsions of the water-in-oil type, characterized by subjecting the emulsion to the action of a demulsifying agent comprising a water-soluble chemical compound of the following formula type:

T'OOC.D.COO(C₂H₄O)$_{m'''}$C₂H₄OOC.D.COO.T' in which T' is a radical derived by the dehydroxylation of a hydroxylated acylated amino compound free from either linkages and of the following formula type:

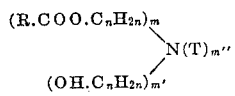

in which R.COO represents the oxy-acyl radical derived from a monobasic detergent-forming acid; T represents a member of the class consisting of hydrogen atoms, non-hydroxy hydrocarbon radicals, and acylated radicals, obtained by replacing a hydrogen atom of the hydroxyl group of an alkylol radical by the acyl radical of a monobasic carboxy acid having less than 8 carbon atoms; $n$ represents a small whole number which is less than 10; $m$ represents the numeral 1, 2, or 3; $m'$ represents the numeral 0, 1, or 2;

and $m''$ represents the numeral 0, 1, or 2, with the proviso that $m+m'+m''=3$; OOC.D.COO is the acid radical derived from succinic acid by removal of the acidic hydrogen atoms; and $m'''$ represents a numeral varying from 7 to 12.

10. A process for breaking petroleum emulsions of the water-in-oil type, characterized by subjecting the emulsion to the action of a demulsifying agent comprising a neutral, water-soluble chemical compound of the following formula type:

T'OOC.D.COO($C_2H_4O$)$_{m'''}$$C_2H_4$OOC.D.COO.T' in which T' is a radical derived by the dehydroxylation of a hydroxylated acylated amino compound free from ether linkages and of the following formula type:

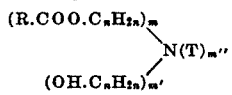

in which R.COO represents the oxy-acyl radical derived from a monobasic detergent-forming acid; T represents a member of the class consisting of hydrogen atoms, non-hydroxy hydrocarbon radicals, and acylated radicals, obtained by replacing a hydrogen atom of the hydroxyl group of an alkylol radical by the acyl radical of a monobasic carboxy acid having less than 8 carbon atoms; $n$ represents a small whole number which is less than 10; $m$ represents the numeral 1, 2, or 3; $m'$ represents the numeral 0, 1, or 2; and $m''$ represents the numeral 0, 1, or 2, with the proviso that $m+m'+m''=3$; OOC.D.COO is the acid radical derived from adipic acid by removal of the acidic hydrogen atoms; and $m'''$ represents a numeral varying from 7 to 12.

MELVIN DE GROOTE.
BERNHARD KEISER.